United States Patent [19]

O'Dea

[11] 4,022,987
[45] May 10, 1977

[54] COIN TELEPHONE STATION SIMULATOR AND CONDITION INDICATOR

[75] Inventor: Orrin B. O'Dea, Garden Grove, Calif.

[73] Assignee: Communication Mfg. Co., Long Beach, Calif.

[22] Filed: Mar. 30, 1976

[21] Appl. No.: 672,258

[52] U.S. Cl. .................. 179/175; 179/175.2 R; 179/6.3 R

[51] Int. Cl.[2] ......................................... H04M 3/26

[58] Field of Search ..... 179/175, 175.2 R, 175.3 R, 179/6.3

[56] References Cited

UNITED STATES PATENTS

| | | | |
|---|---|---|---|
| 2,795,657 | 6/1957 | Boyd | 179/175.2 R |
| 2,820,847 | 1/1958 | King | 179/6.3 R |
| 3,496,300 | 2/1970 | Stokes | 179/175 |

*Primary Examiner*—Douglas W. Olms
*Attorney, Agent, or Firm*—Christie, Parker & Hale

[57] ABSTRACT

A coin telephone station simulator and condition indicator. Separate tip, ring, and ground input/output conditioners are provided for connection to a telephone system for test. A controllable coin present relay simulator circuit is switchable from a first high impedance condition to a second lower impedance condition in between tip and ground conductors. A coin test switch switches the controllable relay simulator circuit from the first to the second condition. A coin present indicator is provided together with means for energizing the coin present indicator when the simulator circuit is in the second lower impedance condition. Coin collect and coin return indicators are provided. A coin collect and return detection circuit is responsive to first and second electrical signals, of opposite polarity, momentarily and separately applied in between the tip and ground conductors for individually energizing, respectively, the coin collect and coin return indicators. Low, acceptable and high voltage indicators are provided. A line voltage detector circuit is responsive to an electrical signal applied between the tip and ring conductors of below a first voltage level for enabling the low indicator and is responsive to a signal above a second voltage level for enabling the high indicator and is responsive to a signal with a voltage level of in between the first and second levels for enabling the acceptable indicator.

24 Claims, 3 Drawing Figures

COIN TELEPHONE STATION SIMULATOR AND CONDITION INDICATOR

BACKGROUND OF THE INVENTION

Coin operated telephones are subject to a variety of possible operating failures. Many of these failures are intermittent and hard to detect and as a result, considerable loss of revenue is incurred by the telephone companies because of the difficulty in detecting a failure or detecting the exact cause of a failure.

As a general rule, coin operated telephones are tested using a conventional ohmmeter and voltmeter. As a result it is necessary for maintenance personnel to operate the telephone set, monitoring the ohmmeter and voltmeter to determine whether or not proper voltage and ground signals appear on the line during the various operating cycles of the telephone set.

The problem is complicated by the fact that one must detect correct line voltage, correct line voltage polarity, correct off-hook line voltage, coin present conditions, correct coin collect voltage, correct coin return voltages, and lack of proper ground connection.

SUMMARY OF THE INVENTION

The present invention is directed to a coin or pay telephone station simulator and condition indicator which can be made portable, for example, small enough to fit in the pocket of an individual's shirt. The simulator and condition indicator may be used for testing coin telephone stations either at the telephone station or in a central office or in between. A self-contained source of power is provided which requires no external power connection. Significantly, the simulation can be made quickly and the result is rapidly flashed back to the user for appropriate maintenance action. Virtually every expected operating condition of a coin telephone station may be rapidly simulated and the operating condition quickly flashed back to the user.

One coin telephone station simulator and condition indicator embodying the present invention will visually indicate line polarity, correct off-hook line voltage, coin present, and correct coin collect or return voltages with respect to station ground.

Briefly, an embodiment of the present invention comprises a coin telephone station simulator and condition indicator for use by a user. At least separate tip and ground input/output conductors are provided for connection to and removal from a telephone system for test. A controllable coin present relay simulator means is switchable between a first high impedance condition and a second lower impedance condition in between the tip and ground conductors. A coin test switch means is operable when switched for enabling the controllable relay simulator circuit to switch from the first to the second condition. Coin present indicator means is provided with means for energizing the coin present indicator means when the relay simulator means is in the second lower impedance condition. Means is present for providing separate coin collect and coin return indication. Coin collect and return detection is provided with means responsive to first and second electrical signals, of opposite polarity, momentarily and separately applied in between the tip and ground conductors for, respectively, providing unique coin collect and coin return electrical signals to the coin collect and coin return indication means.

A preferred embodiment of the coin telephone station simulator and condition indicator has separate tip, ring and ground input/output conductors for connection to a telephone system for test. A controllable coin present relay simulator circuit is switchable from a first high impedance condition to a second lower impedance condition in between the tip and ground conductors. A coin test switch is provided for switching the controllable relay simulator circuit from the first to the second condition. A coin present indicator is provided with means for energizing the coin present indicator when the simulator circuit is in the second lower impedance condition. Separate coin collect and coin return indicators are provided with a coin collect and return detection circuit that is responsive to first and second electrical signals, of opposite polarity, momentarily and separately applied in between tip and ground conductors for individually energizing, respectively, the coin collect and coin return indicators. Low, acceptable and high voltage indicators are provided with a line voltage detector circuit that is responsive to an electrical signal applied between tip and ring conductors of below a first voltage level for enabling the low indicator, that is responsive to a signal above a second voltage level for enabling the high indicator, and that is responsive to a signal with a voltage level of in between the first and second levels for enabling the acceptable indicator.

Preferably an off-hook loading circuit is provided for the telephone system under test and has direct current impedance means and a manually operable off-hook simulator switch for connecting, when actuated, the impedance means in between tip and ring conductors.

According to a further preferred embodiment of the invention the coin present simulator circuit has means operable in the second lower impedance condition for providing a bidirectional direct current return path in between tip and ground conductors.

According to a still further preferred embodiment of the invention, the coin collect and coin return indicators are unidirectional current conducting elements coupled together in parallel. The detection circuit is a bidirectional current conduction means for directing current in between tip and ground conductors, due to the first and second electrical signals, through the parallel coupled unidirectional current conducting elements.

According to an even still further preferred embodiment of the invention the relay simulator has switchable means normally in a high impedance condition and operable, when switched, for remaining in a low impedance condition conducting a low level of current therethrough until current therethrough drops below a predetermined level. The coin test switch is operable for switching the switchable means to the low impedance condition. Means is responsive to a high level of current through the switchable means caused by either of the first or the second electrical signals momentarily applied between tip and ground conductors for terminating the flow of current through the switchable means and thereby switching same back to a high impedance condition.

Preferably the means for energizing the coin present indicator is means for coupling the coin present indicator in series circuit relation to the switchable means.

An even further preferred embodiment of the invention has a plurality of pairs of substantially identical valued impedance means and manually operable switch means for simultaneously coupling any pair of impedance means in series circuit relation with tip and ring conductors, one impedance means of each pair in series with the tip conductor and the other in series with the ring conductor.

An even still further preferred embodiment of the invention has a relay simulator with controllable means for switching the relay simulator to the first high impedance and the second lower impedance condition. Latching means including the controllable means maintains a flow of current established through the controllable means to thereby latch same in the low impedance condition. Means connects the coin test switch to the controllable means for switching the latter to the low impedance condition.

Preferably the latching means includes a self contained source of electrical energy and means for coupling the source of electrical energy to the latching means for establishing the flow of current through the controllable means.

Preferably there is provided means responsive to a high level of current through the switchable means caused by either of the first or second electrical signals momentarily applied between tip and ground conductors for interrupting the flow of latching current through the controllable means.

Preferably the controllable means is a silicon controlled rectifier.

Preferably the means for interrupting includes an optical coupler having a sensing portion coupled in series with the silicon controlled rectifier and a second portion connected for shunting current from the source of electrical energy away from the silicon controlled rectifier responsive to a current exceeding a predetermined level through the first portion.

DESCRIPTION OF THE INVENTION

Figure 1:
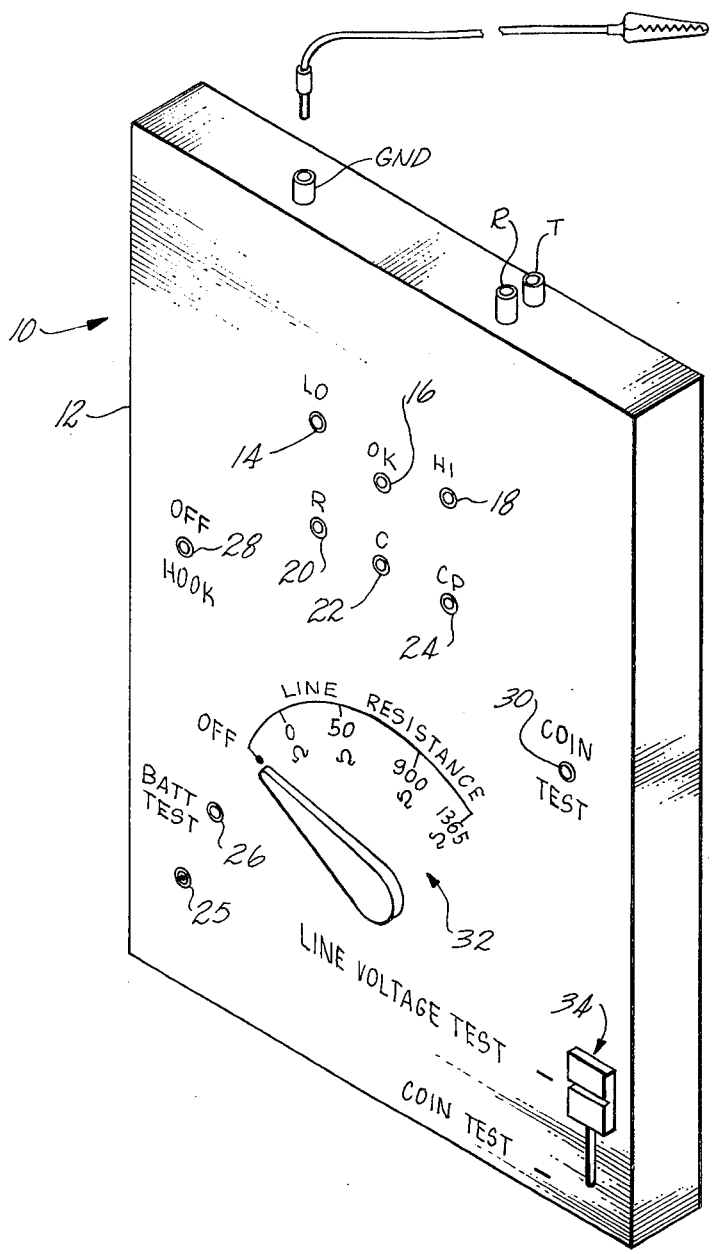
FIG. 1 is a pictorial and schematic view of a coin telephone station simulator and condition indicator and embodying the present invention.

FIG. 1 is a pictorial and schematic view of a coin telephone station simulator and control indicator test set 10 and embodies the present invention. The device has a plastic housing 12 with a hollow interior (not shown) for housing the various electrical and electromechanical parts of the device. The housing 12 is rectangular in shape, approximately 2¾ inches wide by 4½ inches high and 1 5/16 inches in thickness so that it is hand-holdable and also my be inserted into the shirt pocket by the user. Indicators in the form of light-emitting diodes (LED's) are used to indicate the monitored conditions. The LED's include low (LO), acceptable (OK), and high (HI) LED's 14, 16 and 18 for indicating line polarity and correct off-hook line voltage. The LED's also include return collect and coin present LED's 20, 22 and 24 for indicating, respectively, correct coin return voltage, correct coin collect voltage, and correct coin present voltage between tip and ground conductors. A BATT TEST LED is depicted at 26.

The test set has four controls. Two momentary spring return pushbutton switches 28 and 30 are for simulating off-hook and coin test. A rotary switch 32 provides control in a choice of four values of loop resistance. A slide switch 34 selects coin test or line voltage level test.

The test set has three input/output conductors with plugs T, R, and GND for connection to the line tip, line ring, and ground. Conductor test cords have a spade lug, on one end, to plug into the T, R and GND connectors at the upper side of the test set, and an alligator clip on the other end of each of the test cords is used to connect the test set, respectively, to the corresponding line tip, ring, and to station ground of a telephone system (not shown). Only one of the conductor test cords is shown for simplicity. A jack 25 is provided for connection to a dial telephone test set for the purpose described hereinafter.

The operation of the test set will be considered in sections to provide a better understanding of the operation of the device.

Note that the T, R and GND connectors are connected to the tip and ring leads and system ground in a telephone station on each of the tests described below.

Before considering the test set in detail, consider the expected line conditions between the tip and right leads and ground in the typical pay telephone station system. Before the pay telephone station goes off-hook central office battery (-48v) is connected to the ring lead and ground is connected on the tip lead. When the pay telephone goes off-hook, the pay telephone station connects a load between the tip and ring leads which draws the voltage between the tip and ring leads down into a range which is less than a small voltage v1 (5 volts). The central office senses this signal condition and connects dial tone across the tip and ring leads causing voltage between the tip and ring leads to be in a range which is equal to or greater than the voltage v1 and equal to or less than a large voltage v2 (15 volts).

When the pay telephone station receives a coin, the coin itself completes an electrical circuit which connects the winding of a coin relay (not shown) between ground and the tip lead. The coin relay is part of a mechanism which either returns the coin to a return slot or collects the coin to a collection bin in the pay telephone station. The coin relay is actuated by a very large signal (normally 50 volts or larger) applied between the tip lead and ground. The very large signal is several orders of magnitude larger than the large voltage v2. If a coin is to be returned to the return slot a vary large negative voltage is applied, which is − to + from tip lead to ground, thereby energizing the coin relay in a direction so as to cause the coin to be returned to the return slot. If a telephone call has been completed at the pay telephone station and the pay telephone goes back on-hook, the central office will cause the coin to be collected to the collection bin by applying the vary large positive voltage signal, which is + to − from tip lead to ground, thereby actuating the coin relay in a different direction to that for the coin return.

If a coin is stuck, the stuck coin causes the coin relay to be connected between the tip lead and ground, thereby creating a low impedance condition between tip lead and ground. This is sensed by the central office which will repetitively apply either the very large negative return signal or the very large positive collect signal in between the tip lead and ground until the coin is either returned or collected as the case may be.

PREPARATION FOR TEST

Initially the rotary switch 32 is operated to the BATT TEST position. The rotary switch 32 has a spring return (depicted in FIG. 2) which acts to return the rotary switch from the BATT TEST position to the OFF position when pressure is released from the rotary switch. When the rotary switch 32 is in the BATT TEST position, if the BATT TEST LED lights, the test set is ready for use. If the BATT TEST LED does not light, the test set battery voltage is too low for correct test set operation, or the battery is not installed in the test set. Therefore the operator knows that he must replace a 9-volt transistor battery used as the self-contained power source, or install one in the test set if not previously installed.

If the BATT TEST LED lights, indicating a good battery, rotary switch 32 may then be rotated to the desired loop resistance position and the LO LED will light.

Figure 2:
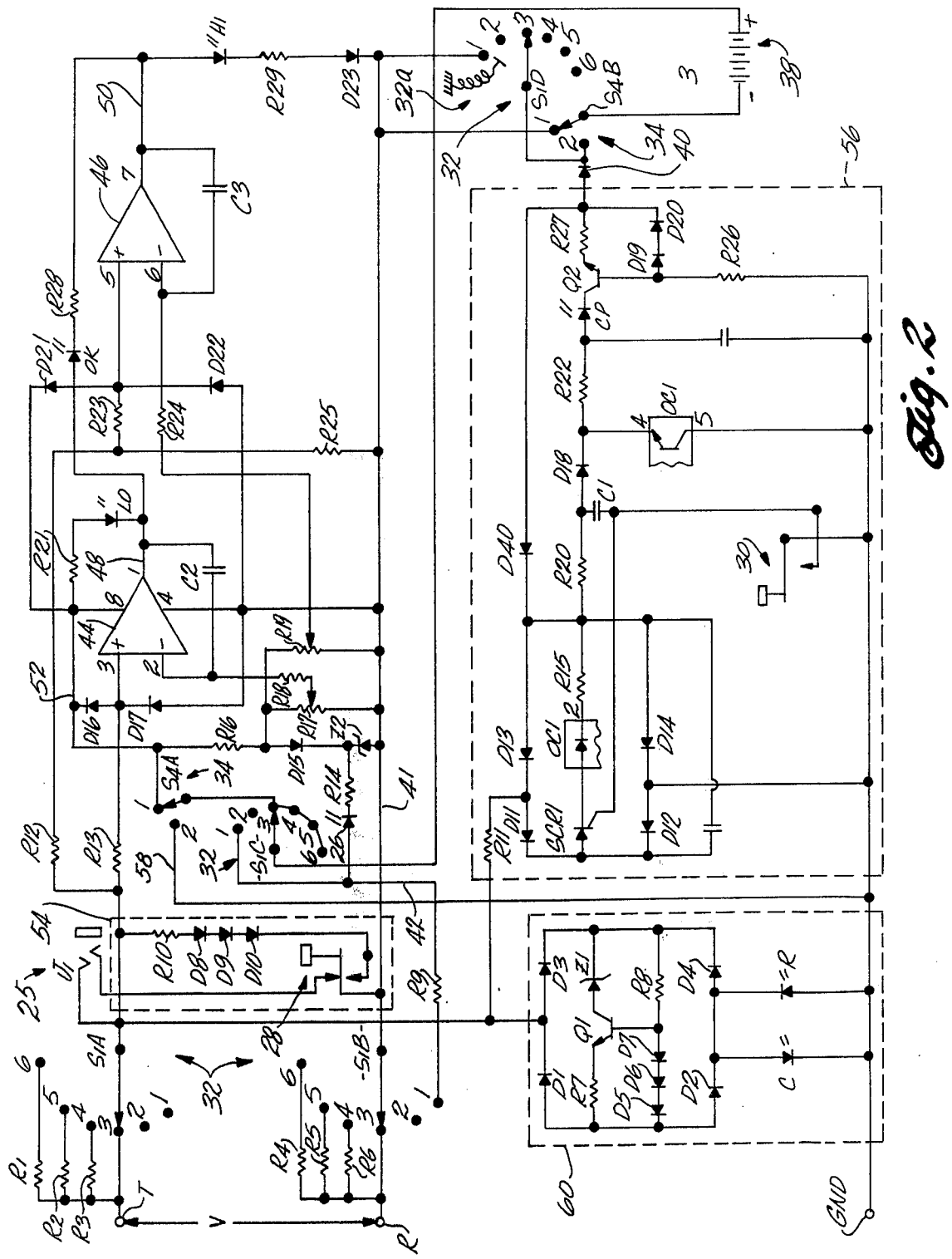
FIG. 2 is a schematic and block diagram of the coin telephone station simulator and condition indicator of FIG. 1.

Consider now in more detail the circuitry involved in the foregoing with respect to the schematic and block diagram of FIG. 2. The battery is depicted at 38 and may be a conventional 9-volt transistor battery.

Table I depicts the FIG. 2 numbered positions of switches 32 and 34 and the corresponding labels used for their positions in FIG. 1.

TABLE I

Rotary Switch 32 (S1) Positions
1 = BATT TEST
2 = OFF
3 = 0Ω
4 = 50Ω
5 = 900Ω
6 = 1365Ω

Slide Switch 34 (S4) Positions
1 = line voltage test
2 = coin test

The rotary switch 32 actually includes four different six-position rotary switches S1A, S1B, S1C and S1D with their movable contacts ganged together. 32a depicts the spring return for returning the ganged rotors from position 1, corresponding to the BATT TEST, to position 2, corresponding to the OFF position. The slide switch 34 actually has two two-position slide switches S4A and S4B with the movable contacts ganged together. It will be noted that the negative side of the battery 38 is connected through S4B of slide switch 34 to either of contacts 1 or 2 of switch S4B. Contact 1 is connected directly to conductor 41, whereas contact 2 is connected to the wiper arm on S1D of rotary switch 32. When the wiper arm of S1D is in position 1 for BATT TEST, the negative side of battery 38 is connected to the conductor 41 which in turn is connectable through S1B to 32 to the R conductor.

When the rotary switch 32 is in position 1 for BATT TEST, S1C and S1D connect the battery 38 in between the conductor 41 and conductor 42. A zener diode Z2 is then connected in series with the BATT TEST LED 26 and a resistor R14 across the battery 38. S1B connects resistor R9 in between the conductor 41 and conductor 42, thereby simulating a load of several times that expected under actual operational conditions. If the output voltage of battery 38 is of sufficient magnitude to switch the zener diode Z2 into conduction, BATT TEST LED 26 is energized, causing it to illuminate and thereby indicate a good battery.

LOOP POLARITY TEST EITHER AT THE STATION LOCATION OR IN CENTRAL OFFICE OR IN BETWEEN

Figure 3:
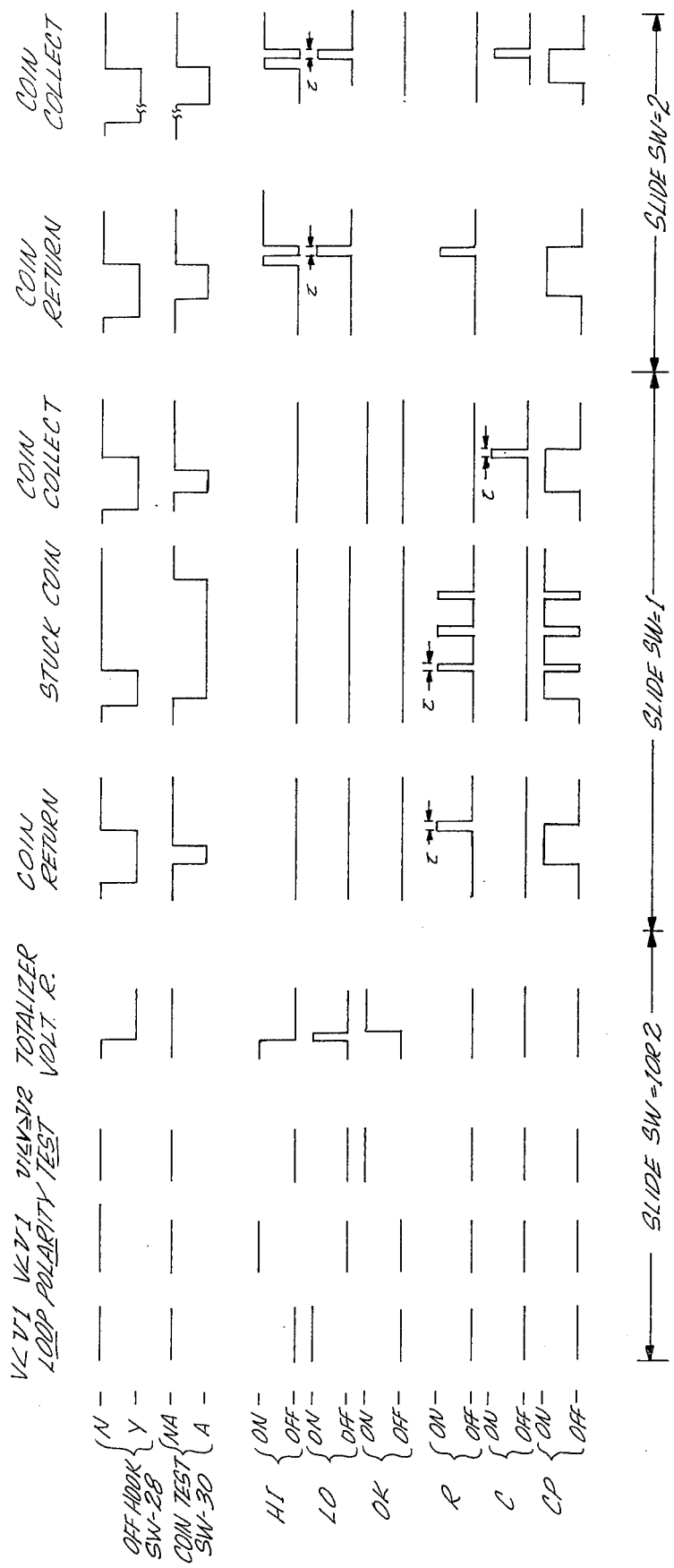
FIG. 3 is a truth table indicating the sequence of operation of the coin telephone station simulator and condition indicator of FIGS. 1 and 2.

The slide switch 34 is actuated to the line voltage test position, position 1. The rotary switch 32 is positioned to any one of line resistance positions 3, 4, 5 or 6, corresponding to line resistance values of 0, 50, 900 and 1365 ohms, respectively. The expected indications by the LO, OK and HI LED's 14, 16 and 18 are depicted under loop polarity test in FIG. 3. If the voltage (depicted as V in FIGS. 2 and 3), + to −, from T to R conductor is less than voltage 1, the LO, OK, and HI LED's 14, 16 and 18, respectively, will be on, off, and off, respectively. In other words, illumination of the LO LED indicates that the voltage from T to R, from + to −, is below the minimum voltage v1. If the voltage, + to −, from T to R conductors is greater than voltage v2, then the LO, OK, and HI LED's 14, 16 and 18 will be off, off, and on, respectively. That is, the HI LED indicates a voltage from T to R, from + to −, greater than v2. If the voltage, + to −, at T to R conductors is in a range that is equal to or greater than v1 and equal to or less than v2, the LO, OK and HI LED's 14, 16 and 18 will be off, on, and off, respectively. The illumination of the OK LED indicates that the voltage from T to R, from + to −, is in the last mentioned range.

Consider now in more detail the circuit of FIG. 2 for causing the foregoing operation. Assume for purposes of explanation that the rotary switch 32 is in position 1 corresponding to 0 ohms resistance and that the slide switch 34 is in position 1 corresponding to the line voltage level test.

Voltage comparators 44 and 46, controlled by the voltage applied in between the T and R conductors, apply signals on conductors 48 and 50, respectively, which appropriately energize one and only one of the LED's LO, OK and HI. Each of the voltage comparators 44 and 46 is a conventional operational amplifier type voltage comparator which is responsive to a high signal at its + input with respect to its − input for forming a relatively high signal at its output relative to the voltage on conductor 41. The relatively high output signal has a magnitude, relative to conductor 41, which is slightly less than the voltage across the battery 38. Each of the voltage comparators 44 and 46 is responsive to a signal at the + input which is lower than the signal at the − input for applying a relatively low output signal which is slightly higher than the signal on conductor 41.

Resistors R12 and R13 are of relatively high resistance, compared to the telephone equipment being tested, so as to avoid any loading which would alter the operation of the telephone equipment to which the T, R and GND conductors are connected. The values of the resistors R12 and R25 are selected so that when the voltage between the T and R conductors is equal to or below the large voltage v2, the signal at the + input of voltage comparator 46 is less than the signal at its − input.

Considering the loop polarity test under the condition where the voltage from T to R is a positive voltage of less than v1, voltage dividers involving fixed resistor R16, potentiometers R17, R19, fixed resistors R16, R18 and R24, and a diode D15 in series with the zener diode Z2, form a source of potential which biases the negative input of the voltage comparators 44 and 46 at approximately the voltage v1, v1. As a result, the signal between the T and R conductors of less than voltage v1 causes the positive input of both of voltage comparators 44 and 46 to be below the level of the signal at the negative input, causing the signals at conductors 48 and 50 to both be low. Since the signals at conductors 48 and 50 are both low and therefore equal, no current flows through the OK LED and it is not illuminated. Additionally, the signal at conductor 50 is low and is not sufficient to illuminate the HI LED. The positive side of the battery 38 is connected to the conductor 52 and accordingly the signal across the LO LED causes it to be energized, indicating that the line voltage from T to R is low.

Assume now the condition where the line voltage between conductors T and R is greater than the large voltage v2. Under these conditions the signal at the + input of both of the voltage comparators 44 and 46 is above that at the − inputs, causing a high signal on the conductors 48 and 50. Therefore, again there is no difference in potential across either the OK LED or the LO LED and neither is illuminated. However, the high signal on the conductor 50 causes current to flow through the HI LED, illuminating it, thereby indicating that the line voltage across the T and R conductors is high.

Assume now that the line voltage across the T and R conductors is in the range equal to or greater than v1 and equal to or less than the large voltage v2. Under these conditions the + input of voltage comparator 44 is higher than at its − input, whereas the + input of voltage comparator 46 is lower than that at its − input. As a result, a high signal appears on conductor 48 and a low signal on conductor 50. Under these conditions the LO and HI LED's are not illuminated because the voltage across them is essentially O, whereas the difference in potential across the OK LED causes it to be illuminated.

Significantly the resistors R21, R28 and R29 are selected so as to minimize the amount of current flowing through the LED's to thereby minimize power consumption from battery 38.

If the polarity of the voltage applied from T to R is reversed so that it is − to +, neither of the voltage comparators 44 and 46 has a signal on its + input above that on its − input. As a result, the LO LED is on.

In summary, when the coin telephone test station being tested is not off-hook, the voltage between the T and R conductors should be in a range above the large voltage v2. Under these conditions the LO and OK LED's should be dark and the HI LED should be illuminated, indicating correct polarity.

The slide switch 34 is the coin test position 2 removes power from the upper part of the circuit depicted in FIG. 2 and hence none of the LO, OK and HI LED's are illuminated. If the slide switch is moved to the line voltage test position, thereby energizing the upper part of the circuit, and there is no change in the LED indication, the telephone loop is open, reversed, or the ring circuit is grounded.

TOTALIZER VOLTAGE REQUIREMENT TEST

The off-hook switch 28 serially connects the series circuit formed by diodes D8, D9 and D10 and a resistor R10 in between the T and R conductors. The diodes D8, D9, D10, resistor R10 and the off-hook switch 28 form an off-hook load simulator in between the T and R conductors similar to that expected under ideal conditions when the coin telephone station goes off-hook. The off-hook switch 28 has a spring return (not shown) to the position depicted in FIG. 2, opening the series circuit between the T and R conductors through the resistor R10 and the diodes D8, D9 and D10. Depression of the off-hook switch 28 serially connects the off-hook simulator circuit 54 in between the T and R conductors which draws the voltage in between conductors T and R from in excess of v2 below the voltage v1. The central office then applies the dial tone and causes a voltage in between T and R conductors in the range of from v1 through v2. Looking at the truth table of FIG. 3 for the totalizer voltage requirement test, the HI LED goes dark, the LO LED lights briefly, and then the OK LED lights, thereby indicating a good loop with off-hook voltage in the range of from v1 through v2.

COIN RETURN TEST

During the coin return test, the slide switch 34 is operated to the coin test position. With the off-hook switch 28 depressed, simulating an off-hook condition, the coin test switch 30 is actuated momentarily and then the off-hook switch is released. Referring to the truth table of FIG. 3 for the coin return test, if the telephone system is operating properly, the R (coin return) LED 20 will light for a short interval of time, t. Also the coin present (CP) LED will be illuminated from the time the coin test switch 30 is actuated until the R LED 20 turns off.

Consider now in more detail the operation of the circuit of FIG. 2 during the coin return test. Included in the test set of FIG. 2 is a coin present relay simulator 56 which simulates the load of the coin present relay in the coin telephone station after a coin has been inserted in the coin telephone station. The coin present relay is the coin telephone station is the relay which either passes the coin to the coin bin or returns the coin to the coin return slot. As discussed above, a vary large negative voltage having a value several orders of magnitude greater than the large voltage v2, from the tip lead to ground, causes the coin present relay in the coin telephone station to pass a coin to the return slot in the telephone. A very large positive voltage applied between the tip and ground conductors causes the coin present relay in the telephone station to pass a coin to the collection bin. The purpose of the coin return test is to indicate whether required circuit conditions exist for the coin relay to properly operate, such as proper ground.

Initially, the slide switch 34 is positioned to the coin test position 2. The coin test switch 30 is then actuated, connecting the control electrode of a silicon controlled rectifier SCR1 to the GND conductor. Before the SCR1 is switched into a low impedance condition, the coin present relay simulator 56 forms a substantially open circuit high impedance condition in between the T and GND conductors. Actuation of the coin test switch 30 switches the SCR1 into the low impedance condition, in between the T and GND conductors, causing current to flow from the − side of the battery 38 through the series circuit formed bh the diode 40, resistor R27, emitter to collector of transistor Q2, coin present (CP) LED, resistor R22, diode D18, resistor R20, resistor R15, light emitting diode part of optical coupler OC1, the SCR1, diode D12, the GND conductor, conductor 58, rotary switch S4A and S1C, back to the + side of the battery 38. Current flowing through this series path is sufficient to illuminate the CP LED but insufficient to cause the light-emitting diode portion of the optical coupler OC1 to switch the transistor portion into conduction. However, the low impedance condition of SCR1 creates a low impedance path for current flow from conductor T along the series path formed by resistor R11, diode D13, resistor R15, the light-emitting diode portion of optical coupler OC1, SCR1, diode D12, and the GND conductor. Under these conditions the central office is presented with an impedance, in between the T and GND conductors, which simulates the coin relay and hence appears as if a coin has properly been inserted in a coin telephone station. When the off-hook switch 28 is released, the central office senses the removal of the load which is a signal to return the coin to the return slot in the coin telephone station. Accordingly, the central office momentarily applies the very large negative voltage signal, a − to + voltage between the T and GND conductors, which causes a high value of current to flow along the series path through the coin present relay simulator 56 formed by R11, D13, R15, the light-emitting diode portion of OC1, SCR1, D12, back to the GND conductor. The current is of sufficient magnitude to energize the light-emitting diode portion of OC1, causing the transistor portion of OC1 to switch into conduction and bypass the current from battery 38 away from the SCR1. The very large voltage applied between the T and GND conductors by the central office is of a short duration t and when it terminates, current through SCR1 drops to 0, switching the SCR1 and hence the coin present relay simulator 56 back to the high impedance essentially open circuit condition.

A coin return and collect detector and indicator circuit 60 is also connected in between the T and GND conductors. When the very high voltage is applied by central office in between the T and GND conductors, current flows through the series circuit in the coin return and collect detector and indicator 60, formed by diode D1, resistor R7, emitter to collector of transister Q1, zener diode Z1, diode D4, and the R LED back to the GND conductor. The series circuit formed by the diodes D5, D6, D7 and resistor R8 is a voltage divider which biases the transistor Q1 into a conductive condition. The zener diode Z1 has a breakdown voltage which is sufficiently high so that in combination with the voltage divider formed by D5, D6, D7 and R8, transistor Q1 is only switched into conduction when the signal between T and GND exceeds the large voltage v2. In this manner a detector is formed which senses when the voltage exceeds the vary large voltage, passing current through and thereby energizing the R LED, indicating that a coin should have been properly returned at the coin telephone station.

STUCK COIN TEST

Two stuck coin tests can be performed. The first simulates the condition for returning a coin to the return slot in a pay station and the second simulates the condition for collecting a coin at the pay telephone station.

Consider first the test for returning a stuck coin. This condition will occur when the pay station goes off-hook, a coin is inserted into the pay station and subsequently, without completing a call, the pay station goes back on-hook. Under these conditions the central office generates a series of very large momentary voltage signals, − to +, from T to GND conductors, which in the pay telephone station cause it to attempt to energize the coin relay (not shown) in such a direction as to return the stuck coin to the return slot. The simulation and test using the test unit during a stuck coin return test will now be described.

Initially, the off-hook switch 28 is depressed and held. The central office goes through the normal sequence causing the HI LED to go dark, the LO LED to light briefly, and then the OK LED to light, indicating a good loop with off-hook voltage between T and R in the range of from v1 through v2. Additionally, the coin test switch 30 is depressed. This operation is performed with the slide switch 34 in the coin test position 2. With the coin test switch 30 depressed, the off-hook switch 28 is released. Referring to the stuck coin test truth table of FIG. 3, it will be seen that the R LED will flash on and off thereby indicating to the user that the central office coin trunk is properly trying to cause the return of a coin but cannot. The test is terminated by releasing the coin test switch, at which time the R LED will stop flashing.

Consider now, in more detail, the operation for the stuck coin return test. The coin present relay simulator 56 is switched to a low impedance condition by actuation of the coin test switch 30 in the manner described for the coin return test. Releasing the off-hook switch 28 reduces the loading between the T and R conductors, causing the low impedance of the coin present simulator 56 to simulate the condition for a stuck coin. The low impedance condition through the coin present relay simulator circuit 56 still exists due to the continued depression of the coin test switch 30. The central office, sensing this condition, sends a signal back to the test set signalling it to return a coin to the user. To this end a very large momentary negative voltage is applied by the central office, which is − to + from the T to GND conductors. This causes current to momentarily flow along the T conductor through a series circuit in the coin present relay simulator 56 formed by resistor R11, diode D11, SCR1, the light-emitting diode portion of OC1, resistor R15 and diode D14 and back to the GND conductor. The current is of sufficient magnitude to cause the light-emitting diode portion of OC1 to energize the transistor portion of OC1, thereby shorting out the current from the battery 38 from the SCR1.

The very large negative voltage between the T and GND conductors is also sensed by the coin return and collect detector and indicator 60. To this end, current flows from the T conductor through the diode D1, resistor R7, emitter to collector of transistor Q1, zener diode Z1, diode D4, the R LED and back to the GND conductor. The voltage divider circuit D5, D6, D7 and R8 in conjunction with the zener diode Z1 switches the transistor Q1 into a low impedance condition, allowing sufficient current to flow to energize the R LED, thereby signalling the user that an attempt is being made to return the coin. The central office applies the very large positive voltage momentarily and then removes it. When the load created by the coin present relay simulator 56 is not removed from in between the T and GND conductors, the central office again applies the very large momentary voltage, − to +, from T to GND and the operation described above is repeated. This continues until the coin test switch 30 is released, switching the coin present relay simulator 56 back to an essentially open circuit high impedance condition thereby signalling the central office that the stuck coin condition no longer exists.

Consider now the test for collecting a stuck coin. This condition occurs in the actual pay telephone station when the pay telephone station goes off-hook, a coin is inserted, a number is dialed and is answered, and then the pay telephone station goes on-hook. In the test set this condition is simulated by inserting a test dial unit into the test jack 25, placing the dial test set off-hook, pressing the coin test switch 30, using the test telephone set to dial a test number and then when the test number is answered placing the test telephone set-on-hook while holding the coin test switch 30 depressed. The operation is essentially identical to that described above except that a very large momentary voltage signal is applied by the central office which is + to − from the T to GND conductors except that the current flowing through the relay simulator 56 and through the coin return and collect detector and indicator 60 are reversed. As a result, the collector (C) indicator LED is illuminated rather than the return indicator LED. This operation will be described in more detail in connection with the coin return and collect test.

COIN COLLECT TEST

The coin collect test is performed by connecting a hand-test telephone set (not shown to the line tip and ring terminals of a telephone circuit through the jack 25. The hand-test telephone set is used to dial a test number. When the call is answered, the coin test switch 30 is depressed, switching the coin present relay simulator 56 into the low impedance condition described above. Then the call is terminated by releasing the line. The line is released, for example, by handing up the hand-test telephone set thereby going on-hook. With this test the coin test switch 30 is only depressed momentarily and accordingly the CP LED goes on during the duration of depression of the coin test switch and then goes off when the very large positive voltage is removed from between T and GND conductor. During the ensuing very large positive voltage the C LED is illuminated for a short time interval T and then goes off. This signals the user that conditions are proper for causing the coin station to collect a coin.

Similar operations can be performed with the slide switch 34 in the line voltage test position as that performed during the coin return and coin collect tests. Under these conditions the CP LED does not turn on; however, the R and C LED's are illuminated as described during the coin return and coin collect tests, respectively. However, in addition, the LO and HI LED's are illuminated following the appropriate voltage conditions between the T and R conductors during the coin return and coin collect tests. The truth table illustrating the sequence of operation for the slide switch in the coin test position during the coin return and coin collect tests is depicted at the right side of FIG. 3.

The rotary switches S1A and S1B whose movable contacts are ganged together with the other slidable switches in slide switch 32, are used to insert various values of resistance in series with the T and R conductors. In this regard the values R6 = R3 = 50 ohms, R5 = R2 = 900 ohms, R4 = R1 = 1365 ohms. One end of the resistors R1, R2 and R3 is connected to the T conductor whereas one end of the R4, R5 and R6 resistors is connected to the R conductor. Thus, a plurality of pairs of substantially identically valued resistors or impedances R6, R3 and R5, R2 and R4, R1 are provided and the rotary switches S1B and S1A form a manually operable switch for simultaneously coupling any pair of resistors in series circuit relation with the T and R conductors, one resistor of each pair in series with the T conductor and the other in series with the R conductor.

The values of resistors R20, R22 and R27 are selected so as to minimize the current flow through the CP LED and thereby minimize power consumption from the battery 38. The capacitor C1 filters out ac Signals from the gate electrode of the SCR1, thereby preventing alternating current noise signals from switching the SCR1 into conduction when not desired.

The diode 40 prevents mixing of the voltages from the central office and the battery 38.

The diodes D16 and D17 and D21 and D22 protect the voltage comparators 44 and 46 from transient voltages which may damage these sensitive circuits.

Although an examplary embodiment of the invention has been disclosed for purposes of illustration, it will be understood that various changes, modifications and substitutions may be incorporated into such embodiment without departing from the spirit of the invention as defined by the claims appearing hereinafter.

What is claimed:
1. A coin telephone station simulator and condition indicator comprising:
    separate tip, ring and ground input/output conductors for connection to a telephone system for test;
    a controllable coin present relay simulator circuit switchable from a first high impedance condition to a second lower impedance condition in between said tip and ground conductors;
    a coin test switch for switching said controllable relay simulator circuit from said first to said second condition;
    a coin present indicator;
    means for energizing said coin present indicator when said simulator circuit is in said second lower impedance condition;
    separate coin collect and coin return indicators;
    a coin collect and return detection circuit responsive to first and second electrical signals, of opposite polarity, momentarily and separately applied in between said tip and ground conductors, for individually energizing, respectively, said coin collect and coin return indicators;
    low, acceptable and high voltage indicators; and
    a line voltage detector circuit responsive to an electrical signal applied between said tip and ring conductors of below a first voltage level for enabling said low indicator, responsive to a signal above a second voltage level for enabling said high indicator, and responsive to a signal with a voltage level of in between said first and second levels for enabling said acceptable indicator.

2. A simulator and indicator according to claim 1 comprising an off-hook loading circuit for the telephone system under test comprising direct current impedance means and a manually operable off-hook simulator switch for connecting, when actuated, said impedance means in between said tip and ring conductors.

3. A simulator and indicator according to claim 1 wherein said coin present simulator circuit comprises means, operable in said second lower impedance condition, providing a bidirectional direct current return path in between said tip and ground conductors.

4. A simulator and indicator according to claim 1 wherein said coin collect and coin return indicators comprise unidirectional current conducting elements coupled together in parallel, said detection circuit comprising bidirectional current conduction means for directing current in between the tip and ground conductors, due to said first and second electrical signals, through the parallel coupled unidirectional current conducting elements.

5. A simulator and indicator according to claim 1 wherein said relay simulator comprises a switchable means normally in a high impedance condition and operable, when switched, for remaining in a low impedance condition conducting a low level of current therethrough until current therethrough drops below a predetermined level, said coin test switch being operable for switching said switchable means to said low impedance condition, and means responsive to a high level of current through said switchable means caused by either of said first or said second electrical signals momentarily applied between said tip and ground conductors for terminating the flow of current through said switchable means and thereby switching same back to a high impedance condition.

6. A simulator and indicator according to claim 5 wherein said means for energizing said coin present indicator comprises means for coupling the coin present indicator in series circuit relation with said switchable means.

7. A simulator and indicator according to claim 1 comprising a plurality of pairs of substantially identical valued impedance means, manually operable switch means for simultaneously coupling any pair of impedance means in series circuit relation with the tip and ring conductors, one impedance means of each pair in series with the tip conductor and the other in series with the ring conductor.

8. A simulator and indicator according to claim 1 wherein said relay simulator comprises controllable means for switching said relay simulator to the first high impedance and the second lower impedance conditions, latching means comprising said controllable means for maintaining a flow of current established through said controllable means to thereby latch same in said low impedance condition, and means for connecting said coin test switch to said controllable means for switching the latter to said low impedance condition.

9. A simulator and indicator according to claim 8 wherein said latching means comprises a self-contained source of electrical energy and means for coupling the source of electrical energy in said latching means for establishing the flow of current through said controllable means.

10. A simulator and indicator according to claim 9 comprising means responsive to a high level of current through said switchable means caused by either of said first or second electrical signals momentarily applied between said tip and ground conductors for interrupting the flow of latching current through said controllable means.

11. A simulator and indicator according to claim 10 wherein the controllable means comprises a silicon controlled rectifier.

12. A simulator and indicator according to claim 11 wherein said means for interrupting comprises an optical coupler having sensing portion coupled in series with said silicon controlled rectifier and a second portion connected for shunting current from the source of electrical energy away from the silicon controlled rectifier responsive to a current exceeding a predetermined level through said first portion.

13. A coin telephone station simulator and condition indicator comprising:
   separate tip, ring and ground input/output conductors for connection to a telephone system for tests;
   a controllable coin present relay simulator circuit forming a first high impedance condition and a second lower impedance condition in between said tip and ground conductors;
   a manually operable coin test switch for switching said controllable relay simulator circuit from said first to said second condition;
   a coin present indicator;
   means for energizing said coin present indicator when said simulator circuit is in said second lower impedance condition;
   separate coin collect and coin return indicators;
   a coin collect and return detection circuit responsive to first and second electrical signals, of opposite polarity, momentarily and separately applied in between said tip and ground conductors for individually energizing, respectively, said coin collect and coin return indicators;
   separate low, acceptable and high voltage indicators; and
   a line voltage detector circuit responsive to an electrical signal applied between said tip and ring conductors of below a first voltage level for energizing said low indicator, responsive to a signal above a second voltage level for energizing said high indicator, and responsive to a signal with a voltage level of in between said first and second levels for energizing said acceptable indicator.

14. A coin telephone station simulator and condition indicator comprising:
   separate tip, ring and ground input/output conductors for connection to and removal from a telephone system for test;
   a controllable coin present relay simulator circuit switchable from a first high impedance condition to a second lower impedance condition in between said tip and ground conductors;
   coin test switch means for enabling said controllable relay simulator circuit to switch from said first to said second condition;
   coin present indicator means;
   means for enabling said coin present indicator means when said simulator circuit is in said second lower impedance condition;
   means for providing separate coin collect and coin return indications;
   a coin collect and return detection circuit responsive to first and second electrical signals, of opposite polarity, momentarily and separately applied in between said tip and ground conductors for, respectively, providing unique coin collect and coin return electrical signals to said coin collect and coin return indication means;
   means for providing low, acceptable and high voltage indications; and
   a line voltage detector circuit responsive to an electrical signal applied between said tip and ring conductors of below a first voltage level for enabling said low indication, responsive to a signal above a second voltage level for enabling said high indication, and responsive to a signal with a voltage level of in between said first and second levels for enabling said acceptable indication.

15. A coin telephone station simulator and condition indicator for use by a user comprising:
at least separate tip and ground input/output conductors for connection to and removal from a telephone system for test;
controllable coin present relay simulator means switchable between a first high impedance condition and a second lower impedance condition in between said tip and ground conductors;
coin test switch means operable when switched for enabling said controllable relay simulator circuit to switch from said first to said second condition;
coin present indicator means;
means for energizing said coin present indicator means when said relay simulator means is in said second lower impedance condition;
means for providing separate coin collect and coin return indications; and
coin collect and return detection means responsive to first and second electrical signals, of opposite polarity, momentarily and separately applied in between said tip and ground conductors for, respectively, providing unique coin collect and coin return electrical signals to said coin collect and coin return indication means.

16. A simulator and indicator according to claim 15 wherein said coin present simulator means comprises means, operable in said second lower impedance condition, providing a bidirectional direct curent return path in between said tip and ground conductors.

17. A simulator and indicator according to claim 15 wherein said means for coin collect and coin return indications comprises unidirectional current conducting elements coupled together in parallel, said detection circuit comprising bidirectional current conduction means for directing current in between the tip and ground conductors, due to said first and second electrical signals, through the parallel coupled unidirectional current conducting elements.

18. A simulator and indicator according to claim 15 wherein, said relay simulator means comprises a switchable means normally in a high impedance condition and operable, when switched, for remaining in a low impedance condition conducting a low level of current therethrough until current therethrough drops below a predetermined level, said coin test switch means being operable for switching said switchable means to said low impedance condition, and means responsive to a high level of current through said switchable means caused by either of said first or said second electrical signals momentarily applied between said tip and ground conductors for terminating the flow of current through said switchable means and thereby switching same back to a high impedance condition.

19. A simulator and indicator according to claim 18 wherein said means for energizing said coin present indicator means comprises means for coupling the coin present indicator in series circuit relation with said switchable means.

20. A simulator and indicator according to claim 15 wherein said relay simulator means comprises controllable means for switching said relay simulator means to the first high impedance and the second lower impedance conditions, latching means comprising said controllable means for maintaining a flow of current established through said controllable means to thereby latch same in said low impedance condition, and means for connecting said coin test switch means to said controllable means for switching the latter to said low impedance condition.

21. A simulator and indicator according to claim 20 wherein said latching means comprises a self contained source of electrical energy, and means for coupling the source of electrical energy in said latching means for establishing the flow of current through said controllable means.

22. A simulator and indicator according to claim 21 comprising means responsive to a high level of current through said switchable means caused by either of said first or second electrical signals momentarily applied between said tip and ground conductors for interrupting the flow of latching current through said controllable means.

23. A simulator and indicator according to claim 22 wherein the controllable means comprises a silicon controlled rectifier.

24. A simulator and indicator according to claim 23 wherein said means for interrupting comprises an optical coupler having a sensing portion coupled in series with said silicon controlled rectifier and a second portion connected for shunting current from the source of electrical energy away from the silicon controlled rectifier responsive to a current exceeding a predetermined level through said first portion.

* * * * *

UNITED STATES PATENT AND TRADEMARK OFFICE
CERTIFICATE OF CORRECTION

PATENT NO. : 4,022,987
DATED : May 10, 1977
INVENTOR(S) : Orrin B. O'Dea

It is certified that error appears in the above-identified patent and that said Letters Patent are hereby corrected as shown below:

Column 1 of ABSTRACT, line 3, "conditioners" should be -- conductors --;

Column 3, line 57, "my" should be -- may --;

Column 4, line 59, "vary" should be -- very --;

Column 7, line 2, "vl" (second occurrence) should be deleted;

Column 7, line 54, "is" should be -- in --;

Column 8, line 36, "is" should be -- in --;

Column 8, line 62, "bh" should be -- by --;

Column 9, line 51, "vary" should be -- very --;

Column 10, line 29, "inpedance" should be -- impedance --;

Column 11, line 28, ")" was deleted after "(not shown".

Signed and Sealed this ninth Day of August 1977

[SEAL]

Attest:

RUTH C. MASON
Attesting Officer

C. MARSHALL DANN
Commissioner of Patents and Trademarks